(12) United States Patent
Williams et al.

(10) Patent No.: US 6,347,799 B1
(45) Date of Patent: Feb. 19, 2002

(54) CAVITY SEALING ARTICLE HAVING IMPROVED SAG RESISTANCE

(75) Inventors: Bryan Williams, San Jose; Ashok K. Mehan, Union City; Edward A. Cydzik, Foster City; Paul W. Martens; Rick Rodkey, both of Pleasanton, all of CA (US)

(73) Assignee: Tyco Electronics Corporation, Middletown, PA (US)

(*) Notice: Subject to any disclaimer, the term of this patent is extended or adjusted under 35 U.S.C. 154(b) by 0 days.

(21) Appl. No.: 09/285,811

(22) Filed: Apr. 1, 1999

(51) Int. Cl.[7] ............................................. E04B 1/682
(52) U.S. Cl. ....................... 277/316; 277/617; 277/627; 277/650
(58) Field of Search .................... 277/316, 314, 277/616, 617, 626, 627, 628, 637, 650; 428/63; 264/46.5

(56) References Cited

U.S. PATENT DOCUMENTS

| | | | |
|---|---|---|---|
| 4,898,630 A | * | 2/1990 | Kitoh et al. |
| 4,901,395 A | * | 2/1990 | Semrau |
| 5,040,803 A | * | 8/1991 | Cieslik et al. |
| 5,160,465 A | * | 11/1992 | Soderberg |
| 5,506,025 A | | 4/1996 | Otto et al. ..................... 428/98 |
| 5,642,914 A | * | 7/1997 | Takabatake |
| 5,678,826 A | * | 10/1997 | Miller |
| 5,931,474 A | * | 8/1999 | Chang et al. |
| 5,979,902 A | * | 11/1999 | Chang et al. |
| 6,146,565 A | * | 11/2000 | Keller ........................ 264/46.5 |

FOREIGN PATENT DOCUMENTS

| | | |
|---|---|---|
| EP | 0 730 999 | 9/1996 |
| WO | WO 98/36944 | 8/1998 |
| WO | WO 99/37506 | 7/1999 |
| WO | WO 00/03894 | 1/2000 |

* cited by examiner

*Primary Examiner*—Lynne H. Browne
*Assistant Examiner*—James M Hewitt

(57) ABSTRACT

Conventional foamable cavity sealing articles are susceptible to sagging when expanded in a vertical orientation with the foaming material facing downwards, because of gravitational drag on the molten material during expansion. The problem is particularly pronounced in foaming materials formulated to have high expansion ratios and low melt viscosities. A solution to the problem is presented in the form of a cavity sealing article having a planar holder and a foamable sealer, the foamable sealer circumscribing the edge of the support member. This construction creates a gripping effect which prevents sagging of the sealing member during expansion.

2 Claims, 3 Drawing Sheets

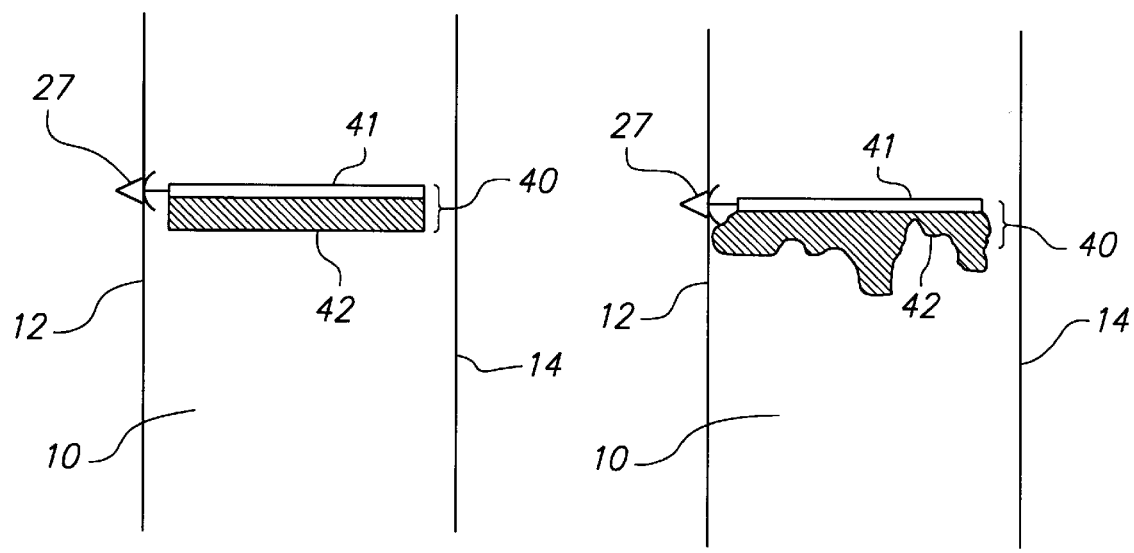
FIG. 1A (PRIOR ART)   FIG. 1B (PRIOR ART)
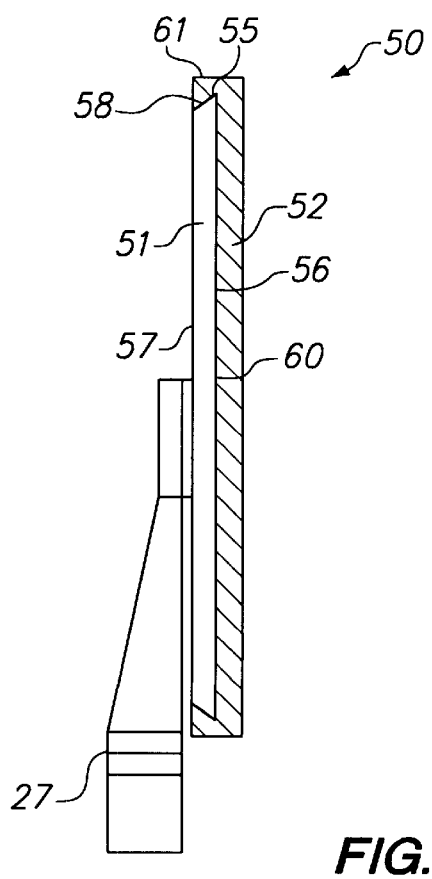
FIG. 2A

CAVITY SEALING ARTICLE HAVING IMPROVED SAG RESISTANCE

CROSS-REFERENCE TO RELATED APPLICATIONS

The subject matter of this application is related to the subject matter of U.S. patent applications Ser. No. 08/805,387, filed Feb. 24, 1997, now abandoned; U.S. Pat. Nos. 5,979,902; 6,114,004; 5,931,474; and Ser. No. 09/249,248, filed Feb. 11, 1999, now abandoned; the disclosures of which are incorporated herein by reference.

BACKGROUND OF THE INVENTION

1. Field of the Invention

This invention relates to cavity sealing articles having improved sag resistance.

2. Description of Related Art

Channels are commonly found in the body structure of automobiles, boats, aircraft, other vehicles, structures (both land and marine), and the like. It is desirable to seal the cavities in such channels against the passage of gases such as air or fumes, moisture, fluids, particulates, etc. As the automotive industry is especially concerned about sealing such cavities in automobiles, the present invention will be discussed primarily in this context.

During the fabrication of automobiles, many body components contain cavities that require sealing to prevent the ingress of moisture and contaminants that can cause corrosion of the body parts. This is especially true with unibody structures, where a heavy frame is replaced by a structurally designed space frame that inherently presents a number of moisture- and contaminant-collecting cavities. These cavities also serve as passages through which road and engine noise and other sounds may be transmitted during operation of the vehicle. For example, the A, B, and C pillars of a vehicle represent elongated cavities that can collect moisture and contaminants and can also transmit sounds that can then radiate into the passenger compartment unless the cavities are at least partially filled with a sealant material. There are other irregular cavities in a vehicle body that desirably are sealed to prevent moisture and contaminants from entering that area and being conveyed to other parts of the vehicle body.

A currently favored technique is the use of a heat-activated foaming sealing material. Typically, a mass of a material capable of expansion (foaming) at elevated temperatures, i.e. a thermoplastic mixture containing both a heat-activated foaming agent and a heat-activated crosslinking agent, is placed on a bracket or other mechanical support or holder, usually made from sheet metal or a molded high temperature thermoplastic, that is capable of being mechanically fastened within the cavity. Because most automobile bodies are now coated by total immersion in phosphating, rustproofing, electrocoating, and other paint baths to ensure that the interiors of all open cavities are coated, the sealing article (the bracket, together with the mass of foamable material), should not fill the cavity cross-section before foaming, so that the coatings may enter the cavity during immersion, flow around or through the sealing article, and drain from the cavity afterwards. As the automobile body is passed through an oven to cure the coating to the metal of the body, the foamable mass expands to fill the cavity cross-section and to seal against the walls of the cavity.

A limitation to this technique occurs when the cavity is in a non-horizontal (i.e., vertical or oblique) channel, such as the A, B, or C pillars of automobiles. During the foaming process, the expanding polymeric mass has a tendency to sag, instead of expanding laterally across the width of the cavity to fill the cavity. This problem is illustrated by reference to FIGS. 1a and 1b. FIG. 1a shows a conventional cavity sealing article 40 (unexpanded) comprising a holder 41 and a foaming sealer 42, for sealing a cavity 10 defined by first and second wall members 12 and 14. A barbed insert 27 passing through a hole (not shown) in wall member 12 holds article 40 at a pre-determined location within cavity 10, in this instance with the sealer 42 side down. When article 40 is heated to expand sealer 42 (FIG. 1b), the molten material of sealer 42 sags because of gravity-induced melt flow, resulting in imperfect sealing of cavity 10.

The problem is more common with formulations of foaming material having low expansions ratios (less than 1.5) and moderately low viscosity in the melt. Cavity sealing articles made with low expansion ratio material tend to have a greater width of foaming material unsupported by the holder. While low viscosity materials have the desirable characteristics of better gap filling capability and better wetting of the cavity wall surfaces (leading to better adhesion thereto), their lower viscosity makes them inherently more susceptible to sagging.

Conversely, if one uses a foamable material which has been crosslinked prior to the expansion step, or is formulated to have high melt viscosity, the sagging situation may be abated to a certain extent, but at the expense of decreased melt flow (gap filling) and wetting. Thus, it is difficult to solve this problem employing only a materials formulation approach.

Hypothetically, one can largely avoid the sagging problem by ensuring that article 40 is always installed with the sealer side up. However, even in this orientation the unsupported edges may still sag. Further, in practice it may not be possible to always have the sealer side up, either because of other design constraints or because of the possibility of human error.

Kitoh et al., U.S. Pat. No. 4,898,630 (1990), recognized this problem (see FIGS. 2–4 therein) and proposed a solution in the form of a composite foaming article, comprising a first sealing member which has an expansion ratio of 1–2× and a second sealing member which has an expansion ratio of 6× or greater, the second sealing member being laminated to the first sealing member.

Takabatake, U.S. Pat. No. 5,642,914 (1997) and Cydzik et al., U.S. Pat. No. 09/013,400, filed Jan. 26, 1998, disclose a construction in which the foamable material is a relatively thin strip of material surrounding the edges of the bracket. Because there is a smaller amount of material, the sagging problem is generally avoided. However, the absolute amount of expansion in a particular direction is given by the product of the linear dimension of the foamable material in that direction and the expansion ratio. Since the former is small, the absolute amount of expansion (i.e., gap filling capability) will be correspondingly small.

Thus, it is desirable to develop a cavity sealing article immune to sagging problems, which also has a large gap filling capability.

BRIEF SUMMARY OF THE INVENTION

Accordingly, we provide an article for sealing a cavity, comprising:
 (a) a planar holder having first and second faces, for holding the article at a predetermined position within a cavity to be sealed, and (b) a sealer comprising a foamable polymer composition; the sealer having a planar face substantially coextensive with the first face of the holder and in face-to-face contact therewith and further having a peripheral portion which circumscribes the holder in the plane thereof and covers the perimeter of the second face of the holder.

BRIEF DESCRIPTION OF THE DRAWING(S)

FIGS. 1a and 1b illustrate the problem of sagging when sealing a cavity in a vertical channel.

FIGS. 2a, 2b, 2c, and 2d show a cavity sealing article according to the invention.

Figure 2B:
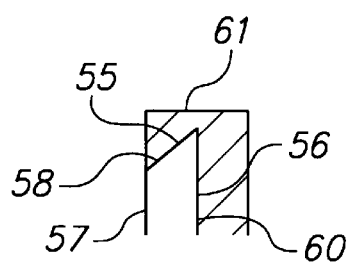

Herein, reference numerals repeated from one figure to another denote the same or equivalent elements.

DETAILED DESCRIPTION OF THE INVENTION

Our invention is now discussed by reference to the figures, beginning with FIG. 2a, which shows in side cross-sectional view a cavity sealing article 50. Article 50 comprises a planar holder 51 and a sealer 52 comprising a foamable polymer. Holder 51 has a first planar face 56 and a second planar face 57. Sealer 52 has a planar face 60, which is substantially coextensive with first face 56 and is in face-to-face contact therewith, covering first face 56. Sealer 52 has a peripheral portion 61 which circumscribes holder 51 and covers perimeter 55 of second face 57. Preferably, the central area of second face 57 is left uncovered. Perimeter 55 has, in this embodiment, a bevel 58 which lies in the perimetral area. Insert 27 serves to hold article 50 at a predetermined position within a cavity (not shown) to be sealed. FIG. 2b shows a magnified view of the top portion of article 50.

Figure 2C:
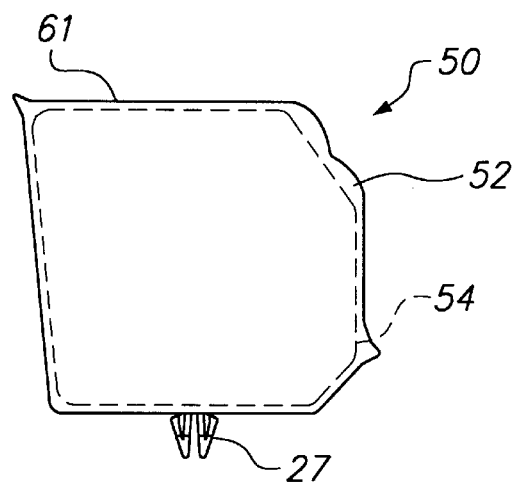
Figure 2D:
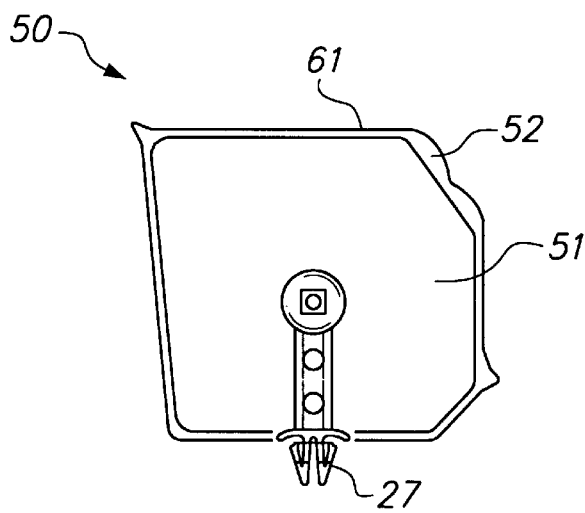

FIG. 2c is a plan view from the front (sealer 52) side. Holder 51 is largely obscured, except for a part of insert 27. Dotted line 54 shows the hidden outline of holder 51. FIG. 2d is a plan view from the back (holder 51) side, showing how peripheral portion 61 of sealer 52 wraps around the edge of holder 51 and covers the perimeter thereof, including the bevel.

Figure 3A:
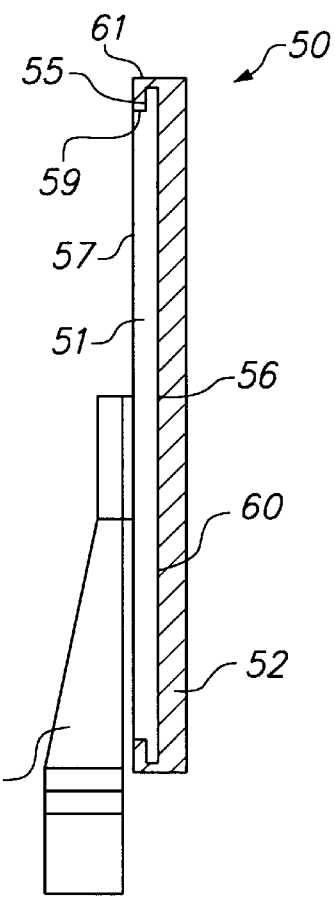
FIGS. 3a, 3b and 4 show other embodiments of the invention.
Figure 3B:
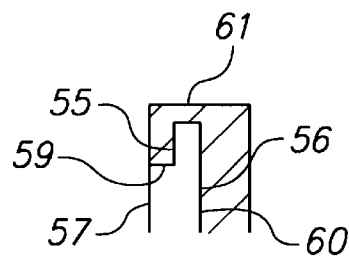

FIG. 3a shows an alternative embodiment of the invention, differing from that of FIG. 2a in that perimeter 55 has a step 59, instead of a bevel. FIG. 3b shows a magnified view of the top portion of the embodiment of FIG. 3a.

Figure 4:
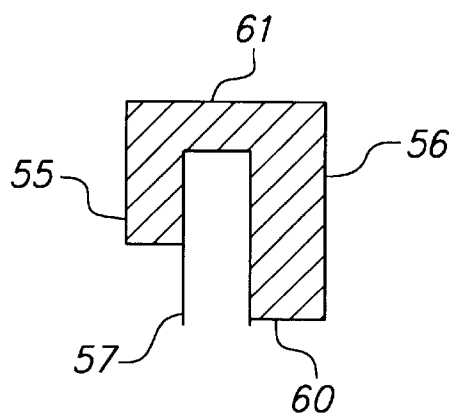

FIG. 4 shows yet another embodiment of the invention, in which perimeter 55 is "plain," that is, has neither a bevel, step, or other similar feature. Nevertheless, peripheral portion 61 can wrap around the edge of holder 51 and provide improved sag resistance.

Figure 5A:
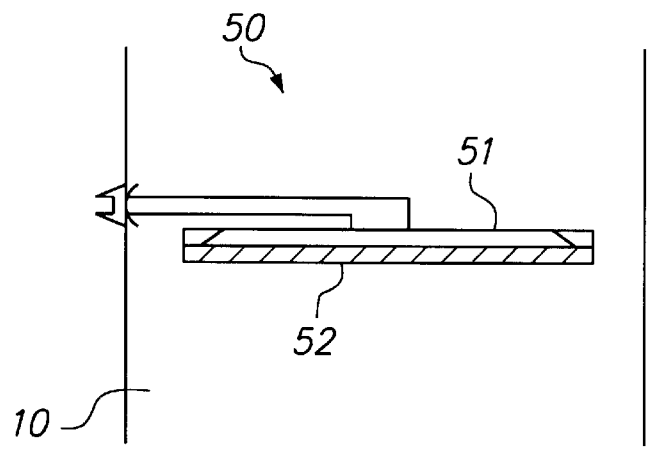
FIGS. 5a and 5b illustrate how the invention can seal cavities without sagging.
Figure 5B:
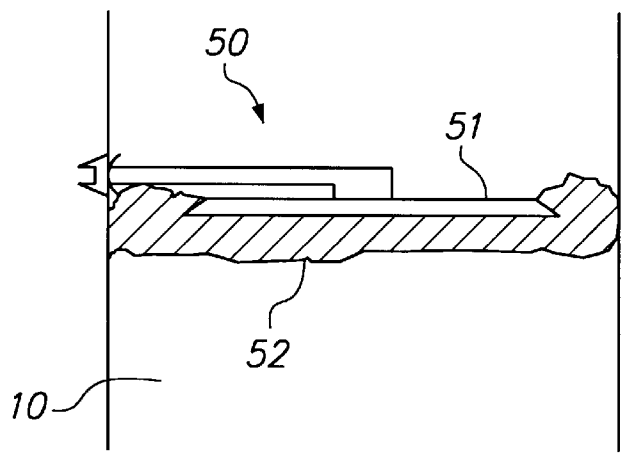

The advantageousness of the invention may be seen by reference to FIGS. 5a and 5b. FIG. 5a shows an unexpanded cavity sealing article 50 of this invention, in this instance the embodiment in which the second face has a beveled perimeter, inserted sealer-side down in a cavity 10. Upon heating to foam and expand article 50 (FIG. 5b), the slight overmolding of sealer 52 allows it to adhere or grip to the back side of holder 51 and provides the additional support to minimize drooping or sagging of the expanding material of sealer 52 during expansion.

The overall sealing performance is improved, because linear expansion of the material is more efficient, overcoming any loss in expansion due to sagging. Unlike the prior art alternatives in which the foamable material is limited to a narrow strip, there is a full width of foamable material participating in the expansion, so that large lineal expansions may be achieved. (Recall that the absolute amount of expansion, i.e., gap filling capability, is given by the product of the width and the expansion ratio.) Typically, the gap between sealer 52 and the cavity walls is between 2 and 10 mm, most typically about 5 mm. This gap allows coatings to flow through cavity 10 during immersion of an automobile frame into a coating bath, coat its walls, and drain from it after removal from the coating bath, but before foaming.

Figure 6:
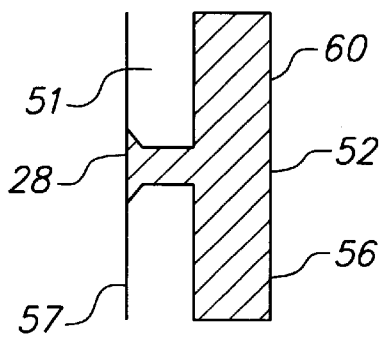
FIG. 6 shows an optional feature of the invention.

FIG. 6 shows an optional feature of the invention. Holder 51 may have a through-hole 28 across its thickness, filled with the foamable polymer composition of sealer 52. Preferably, through-hole 28 is chamfered, as shown, to provide better mechanical interlocking between holder 51 and sealer 52. This feature provides additional anti-sag support in the middle of the article. Through-holes of this type are described in further detail in U.S. application Ser. No. 09/249,248, filed Feb. 11, 1999, the disclosure of which is incorporated herein by reference.

Suitable foamable materials for the sealer include those disclosed in Fried et al., U.S. Pat. No. 4,166,890 (1979); Noda et al., 4,203,815 (1980); Suzuki et al., 5,091,435 (1992); Hanley et al., 5,266,133 (1993); Hanley et al., 5,373,027 (1994); Soderberg, 5,385,951 (1995); Tsuji et al., 5,677,382 (1997); and 5,931,474; the disclosures of which are incorporated herein by reference.

Specifically, compositions for the sealer will be foamable polymer compositions having a foaming temperature appropriate for the temperature range of intended application, for example a foaming temperature within the range of temperatures encountered in bake ovens for vehicle bodies, and the like. Such compositions will contain a base polymer and a blowing agent to cause foaming of the polymer. They will typically also contain fillers, antioxidants, flame retardants, and/or other stabilizers such as are conventional in polymeric articles, and may contain pigments, plasticizers, adhesion promoters, activators for the blowing agents, and the like.

The sealer may, and preferably will, contain a chemical crosslinking agent to strengthen the resulting foamed polymer, and may also contain a tackifier to maximize adhesion of the article to the cavity walls on foaming. The sealer may be crosslinked or uncrosslinked before foaming, the latter meaning that it is either totally free of crosslinking or has such a low degree of crosslinking that it substantially retains the foaming and adhesive characteristics of an uncrosslinked polymer. Desirably, the sealer becomes crosslinked on foaming, but it is within the scope of the invention that the sealer may be uncrosslinked (as defined immediately above) even after foaming.

Suitable base polymers include a wide range of polymers, typically chosen for a particular application so that the resulting article will foam at a convenient temperature for sealing of the cavity to be sealed and will be stable under intended use conditions. The melt flow rate, as measured by ASTM D-1238-95, of the base polymer (or mixture of polymers forming the base polymer) will desirably be from 0.5 to 10, preferably from 3 to 7, and in any event will desirably be chosen to give an appropriate degree of expansion of the sealing article during foaming.

Suitable polymers thus include olefinic polymers such as very low density poly-ethylene, low density polyethylene, medium density polyethylene, high density poly-ethylene, polyethylenes or ethylene copolymers prepared by metallocene polymerization (such as Exact [Exxon] and Engage [Dow]), ethylene copolymers such as ethylene-vinyl acetate copolymer (EVA), ethylene-methacrylic acid copolymer, ethylene-acrylic acid copolymer, ethylene-butyl acrylate copolymer, ionomers (such as Surlyn [duPont] and Iotek [Exxon]), ethylene terpolymers such as ethylene-vinyl acetate-methacrylic acid copolymer, elastomers such as ethylene-propylene rubber, EPDM, nitrile rubbers, butyl rubbers, chloroprene, chloropolyethylene, polyacrylate elastomers, chlorosulfonated polyethylene, thermoplastic elastomers, and fluoropolymers such as polyvinylidene fluoride, ethylene-tetrafluoroethylene copolymer, fluorinated ethylene-propylene copolymer, poly(chlorotrifluoroethylene), ethylene-chlorotrifluoroethylene copolymer, etc., and mixtures of any two or more of the above.

The predetermined temperature range at which the sealer is foamed is typically between 115 and 250° C., such as found in bake ovens used in the automobile industry. More typically, the temperature range is between 150 and 180° C., with possible short excursions to temperatures above 180° C., as may occur when movement along an automobile assembly line is interrupted. Typical baking cycles are on the order of 30 min in duration.

Suitable fillers for the sealer include inorganic fillers such as zinc oxide, barium sulfate (Huberbrite), calcium carbonate, carbon black, magnesium hydroxide, alumina trihydrate, and the like; at a concentration up to about 40 parts per 100 parts of the base polymer.

The blowing agent is chosen so as to effect foaming and expansion of the sealer at an elevated temperature normally present during the manufacture of the product containing the cavity to be sealed; for example, at a temperature normally present during passage of an automobile body through a paint bake oven (typically 11 5° C. to 250° C.). Suitable blowing agents will include from 1 to 15 parts per 100 parts of base polymer of an azodicarbonamide or benzenesulfonyl hydrazide. Suitable azodicarbonamide blowing agents include Celogen® 130 or 3990; and suitable modified azodicarbonamide agents include Celogen® 754 or 765, all from Uniroyal Chemical. Suitable benzenesulfonyl hydrazide blowing agents include p,p'-oxybis(benzenesulfonyl hydrazide), sold as Celogen® OT, and p-toluenesulfonyl hydrazide, sold as Celogen® TSH, both also from Uniroyal. The blowing agent may also be made up of a combination of agents depending on the degree of expansion desired for a particular application; and may also include a blowing agent activator such as diethylene glycol, urea, dinitrosopentamethylenetetramine (DNPT), and the like. Certain fillers, such as zinc oxide (Kadox), may also act as activators for the blowing agent. The amount of activator added will depend on the choice of blowing agent and the amount of expansion required.

Flame retardants may also be present, of such kinds and at such concentrations as will provide flame retardancy for the article. These may include halogenated flame retardants such as the polybrominated aromatics (e.g. decabromobiphenyl), and the like, for example in combination with inorganic materials such as antimony trioxide; or may include non-halogenated flame retardants, such as the magnesium hydroxide and alumina trihydrate previously mentioned as fillers.

The chemical crosslinking agent is preferably a free radical crosslinking agent compatible with the base polymer of the article. Preferred chemical crosslinking agents are peroxides, such as bis(t-butylperoxy)diisopropylbenzene, 1,1-di-t-butylperoxy-3,3,5-trimethylcyclohexane, 4,4-di-t-butylperoxy n-butyl valerate (Trigonox), dicumyl peroxide (Dicup), and the like. In most cases, the chemical crosslinking agent is provided at 1 to 5 parts per 100 parts of base polymer.

The blowing agent and the chemical crosslinking agent will be chosen so that the chemical crosslinking agent has an activation temperature approximately that of the blowing agent. For example, it may have an activation temperature slightly below that of the blowing agent, so that the foam maintains stability during expansion, but desirably the kinetics of the crosslinking and foaming reactions are such that the sealer expands and foams on heating, and adheres to the walls of the cavity, before the resulting foam is completely crosslinked by action of the chemical crosslinking agent. Desirably, the activation temperature of the blowing agent will be chosen so that the blowing agent is not easily accidentally activated (such as by mixing at a temperature above the optimal mixing temperature, during welding or other forming of a cavity in which the sealing article is emplaced, or during phosphating, painting or other coating treatments, or drying of such coatings) but is only activated when it encounters temperatures in which it is desired that the sealing article should foam, such as are present in bake ovens.

A tackifier, if present, will be chosen to enhance the tackiness of the sealer, in particular the periphery of the sealer which will come into contact with the cavity walls, on expansion but not such that it is tacky before expansion, since it is generally desirable that the outer surface of the sealer should be dry and non-tacky during initial placement of the article in the cavity. Desirably, to enhance the adhesive qualities of the base polymer at the temperature of expansion, the tackifier will have a relatively low molecular weight, no significant crystallinity, a ring-and-ball softening point above at least 50° C. (and preferably higher, near the softening point of the base polymer), and will be compatible with the base polymer and other polymers present. The tackifier may be present in up to 30 parts per 100 parts of base polymer. Suitable tackifiers include novolak resins, partially polymerized rosins, tall oil rosin esters, low molecular weight aromatic thermoplastic resins, Picco® and Piccotac® resins from Hercules Chemical, and the like.

Antioxidants, adhesion promoters, plasticizers, pigments, and the like may also be employed in conventional amounts.

A first exemplary preferred formulation is:

| Material | Weight % | Supplier/Source | Description |
| --- | --- | --- | --- |
| Elvax 460 | 74.4 | duPont | EVA copolymer |
| Irganox 1076 | 0.7 | Ciba-Geigy | Antioxidant |
| Kadox 911 | 3.7 | Marman/Keystone | Zinc oxide |
| Piccotac 95 | 11.2 | Hercules | Tackifier |
| Vulcup 40KE | 3.0 | Hercules | Peroxide |
| OT-72-DG | 2.5 | Elastochem | Blowing agent |
| SR350-DD | 3.0 | Sartomer | Crosslinking promoter |
| Raven c ultra beads | 1.5 | Columbian Chemical | Carbon black (colorant) |

A second exemplary preferred formulation is:

| Material | Weight % | Supplier/Source | Description |
|---|---|---|---|
| ATEVA 1710 | 78.74 | A.T. Plastics | EVA copolymer |
| Irganox 1076 | 0.79 | Ciba-Geigy | Antioxidant |
| Kadox 911 | 3.94 | Marman/Keystone | Zinc oxide |
| Piccotac 95 | 5.91 | Hercules | Tackifier |
| Vulcup 40KE | 3.15 | Hercules | Peroxide |
| OT-72-DG | 4.72 | Elastochem | Blowing agent |
| SR350-DD | 2.36 | Sartomer | Crosslinking promoter |
| Raven c ultra beads | 0.39 | Columbian Chemical | Carbon black (colorant) |

A third exemplary preferred formulation is given below. This one is slightly higher in viscosity than the preceding two.

| Material | Weight % | Supplier/Source | Description |
|---|---|---|---|
| Elvax 470 | 71.94 | du Pont | EVA copolymer |
| Irganox 1076 | 0.72 | Ciba-Geigy | Antioxidant |
| Kadox 911 | 3.60 | Marman/Keystone | Zinc oxide |
| Piccotac 95 | 10.79 | Hercules | Tackifier |
| Vulcup 40KE | 2.88 | Hercules | Peroxide |
| OT-72-DG | 7.19 | Elastochem | Blowing agent |
| SR350-DD | 2.88 | Sartomer | Crosslinking promoter |

The composition may be prepared by methods conventional in the art of polymer blending, such as twin screw extruders, Banbury or Brabender type mixers, and sigma blade mixers, with care being taken to ensure that the temperature of the blend does not rise to such an extent that the chemical crosslinking agent or blowing agent are activated. Typically, the base polymer, other polymers/tackifier (if present), and antioxidant are added first, and blended to homogeneity. The filler, adhesion promoter, pigments (if present) may be mixed with the base polymer, or may be added after the base polymer has been softened by mixing. These first mixing stages are not particularly temperature-sensitive. Once all ingredients other than the blowing and crosslinking agents have been added and fully blended, however, temperature control becomes important as these last agents are added. Accordingly, the mixer is cooled so that the temperature of the composition does not exceed about 95° C., and more preferably does not exceed about 80° C.; the blowing agent(s), accelerator(s), crosslinking agents, and any plasticizers are added, and the resulting composition is subjected to high shear mixing under controlled temperature conditions until the composition is homogeneous. The composition may then be cooled, for example by processing through a two-roll mill with cooled rollers.

The resulting bulk composition may then be formed into the appropriate shape for the sealer by any appropriate means. For example, it may be extruded or rolled into sheets for cutting, extruded into rods of a desired cross-sectional configuration to be subsequently sectioned into the articles, molded into desired shapes, or pelletized for later molding or extrusion. Preferred methods of manufacture include injection molding, insert molding, and extrusion coating.

The particular composition used to make the sealer is not critical; and a person of ordinary skill in the art should have no difficulty, having regard to that skill and this disclosure, including the references cited here, in determining a suitable formulation to prepare a cavity sealing article of this invention or in optimizing such a composition for a particular application.

The holder-sealer combination may be made as follows. The holder, made of an engineering thermoplastic such as nylon, is injection molded. The sealer is then overmolded over the holder via a compression molding step. This method is advantageous in eliminating most of the stresses induced in a molding step. Alternatively, coining may be used.

Further, insert molding may be used, in which care is exercised to not let the holder surface cool below a certain minimum temperature before the sealer material is overmolded onto the holder, to thermally bond the two. (Care should be exercised in selecting and using a mold release agent, so that a thin film of mold release agent on the holder's surface does not render the holder surface unbondable.)

This invention may be practiced in combination with the invention disclosed in U.S. application Ser. No. 09/249,248, filed Feb. 11, 1999, now abandoned in which a secondary sealer having a melt viscosity lower than that of the foaming sealing member is used to seal acute corners which may be present in a cavity.

This invention may also be practiced in combination with the invention disclosed in U.S. Pat. No. 5,931,474 in which the sealing member comprises a crosslinked and an uncrosslinked portion.

The preceding two applications are incorporated herein by reference.

The foregoing detailed description of the invention includes passages that are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure or embodiment, such feature can also be used, to the extent appropriate, in the context of another figure or embodiment, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. An article for sealing a cavity, comprising:
   (a) a planar holder having first and second planar faces, for holding the article at a predetermined position within a cavity to be sealed, and
   (b) a sealer comprising a foamable polymer composition; the sealer having a planar face substantially coextensive with the first face of the holder and in face-to face contact therewith and further having a peripheral portion which circumscribes the holder in the plane thereof and covers the perimeter of the second face of the holder;
   wherein the planar holder has a through-hole across its thickness, the through-hole being filled with the foamable polymer composition of the sealer.

2. An article according to claim 1 wherein the through-hole is chamfered.

\* \* \* \* \*